(12) United States Patent
Majumder et al.

(10) Patent No.: US 12,576,974 B2
(45) Date of Patent: Mar. 17, 2026

(54) SYSTEM AND METHOD FOR DE-ICING OF A CARBON COMPOSITE PROPELLER

(71) Applicant: UBIQ Aerospace AS, Trondheim (NO)

(72) Inventors: Shibarchi Majumder, Trondheim (NO); Nicolas Müller, Trondheim (NO); Kasper Borup, Trondheim (NO)

(73) Assignee: UBIQ Aerospace AS, Trondheim (NO)

( * ) Notice: Subject to any disclaimer, the term of this patent is extended or adjusted under 35 U.S.C. 154(b) by 0 days.

(21) Appl. No.: 18/567,114

(22) PCT Filed: Jun. 13, 2022

(86) PCT No.: PCT/EP2022/066045
§ 371 (c)(1),
(2) Date: Dec. 5, 2023

(87) PCT Pub. No.: WO2022/258849
PCT Pub. Date: Dec. 15, 2022

(65) Prior Publication Data
US 2024/0262511 A1     Aug. 8, 2024

(30) Foreign Application Priority Data
Jun. 11, 2021     (GB) ..................................... 2108370

(51) Int. Cl.
*B64D 15/12*          (2006.01)
*B64U 30/29*          (2023.01)
*H05B 3/56*           (2006.01)

(52) U.S. Cl.
CPC ............. *B64D 15/12* (2013.01); *B64U 30/29* (2023.01); *H05B 3/56* (2013.01); *H05B 2214/02* (2013.01)

(58) Field of Classification Search
CPC ........ B64D 15/12; B64D 45/02; B64D 15/14; B64U 30/29; B64U 30/20; B64U 10/00;
(Continued)

(56) References Cited

U.S. PATENT DOCUMENTS 2,499,034 A * 2/1950 Park ...................... B64D 15/12
                                                244/134 D
2,552,075 A    5/1951 Van Daam
(Continued)

FOREIGN PATENT DOCUMENTS

CN      112298548 A     2/2021
GB        1503687 A     3/1978
(Continued)

OTHER PUBLICATIONS

Search Report, United Kingdom Application No. 2108370.4, dated Nov. 5, 2021.
(Continued)

*Primary Examiner* — Chelsea E Stinson
*Assistant Examiner* — Eric A Lange
(74) *Attorney, Agent, or Firm* — MARSHALL, GERSTEIN & BORUN LLP

(57) ABSTRACT
A propeller blade comprising a de-icing system is described, wherein the propeller blade comprises a blade body 1 comprising a carbon fiber fabric skin, a leading edge 11, a trailing edge 12, a hub end 9 and a tip end 10. The blade body 1 comprises a resistive wire 4 that extends along the leading edge 11 to a conductive glue 6. The resistive wire 11, the conductive glue 6 and the carbon fiber fabric in the skin of the blade body 1 form a conductive path for an electrical current. A propeller comprising a plurality of the propeller blades, a UAV comprising one or more of the propellers are also described.

21 Claims, 6 Drawing Sheets

(58) Field of Classification Search
CPC ....... B64C 39/024; B64C 11/20; B64C 11/26;
H05B 3/56; H05B 2214/02; H05B
2203/016; H05B 1/023; F03D 80/40;
F01D 25/02; F01D 5/282; F05D
2300/603; F05D 2300/6034
See application file for complete search history.

(56) References Cited

U.S. PATENT DOCUMENTS

| | | | | |
|---|---|---|---|---|
| 4,021,008 | A | | 5/1977 | Eichenauer |
| 5,925,275 | A | * | 7/1999 | Lawson ................. B64D 15/12 |
| | | | | 219/543 |
| 5,947,418 | A | * | 9/1999 | Bessiere ............... B64D 15/14 |
| | | | | 219/545 |
| 5,971,323 | A | * | 10/1999 | Rauch ................... B64D 15/12 |
| | | | | 219/202 |
| 6,145,787 | A | * | 11/2000 | Rolls ...................... F03D 1/065 |
| | | | | 416/223 R |
| 2014/0086748 | A1 | * | 3/2014 | Peltola ................. F03D 1/0675 |
| | | | | 29/889.71 |
| 2014/0127017 | A1 | | 5/2014 | Virtanen et al. |
| 2017/0174350 | A1 | * | 6/2017 | Seminel ................. B64D 15/12 |
| 2018/0370638 | A1 | | 12/2018 | Gibert et al. |
| 2022/0212806 | A1 | * | 7/2022 | Kotani ................... B64U 20/60 |

FOREIGN PATENT DOCUMENTS

| | | | |
|---|---|---|---|
| GB | 2001022 | A | 1/1979 |
| GB | 2218473 | A | 11/1989 |
| GB | 2291575 | A | 1/1996 |
| JP | 2007323965 | A * | 12/2007 |

OTHER PUBLICATIONS

International Search Report and Written Opinion, International Application No. PCT/EP2022/066045, mailed Sep. 22, 2022.

* cited by examiner

SYSTEM AND METHOD FOR DE-ICING OF A CARBON COMPOSITE PROPELLER

The present invention relates to a propeller blade and in preferred examples concerns a system for and method of preventing ice formation on the surface of a propeller of an aircraft, such as an unmanned aerial vehicle (UAV). This may be implemented as an integral part of the propeller and/or aircraft.

It is known to use propellers for propulsion of vehicles such as aircraft, including lightweight UAVs, also referred to as drones. UAVs typically employ one main propeller, or a plurality of small propellers distributed about the body of the UAV. The propellers can be mounted in a horizontal configuration to provide lift and/or in a vertical configuration to provide thrust. Each propeller consists of a number of blades and is mounted on a shaft. In electrical systems the shaft is driven by an electric motor to thereby rotate the propeller.

Ice can build up on the surfaces of aircraft during flight which increases their weight, which leads to a reduction in lift and in worst cases can cause the aircraft to stall. In the case of a propeller, ice can change the profile of the propeller blade, increasing the drag and reducing the lift which leads to a reduction in thrust or lift. Ice formation is especially problematic for UAVs due to their light weight and that ice can interfere with the sensors used to feedback essential information to the autopilot system.

Large aircraft typically use mechanical or chemical de-icing systems which add significant weight to the aircraft and are therefore not suitable for small UAVs. There is therefore a need to find alternative de-icing system for use on a propeller for a UAV.

One example of a de-icing system for UAVs can be found in US 2018/370638 where the propeller blade is provided with a furrow that extends in the skin of the blade. The furrow includes an electrically conductive track which extends in a sinuous path changing direction at the end of the blade and runs along the leading edge.

A further example of a de-icing system for UAVs can be found in CN 112298548 which describes a rotor blade with an electric hearing wire on the windward surface, i.e. the leading edge.

Ice formation is most prevalent on the leading edge of the propeller blades, however it may also be significant on the other parts of the blades and compromise the functionality of the propeller. Therefore a complete, but non-uniform heating of the propeller blades would be beneficial but present methods with a heating wire or heating pad-based electro-thermal de-icing techniques are limited to uniform heating of a specific part of the propeller.

Viewed from a first aspect, the invention provides a propeller blade for a UAV, the propeller blade comprising: a hub end; a tip end; a blade body comprising a skin of carbon fiber fabric; a conductive glue fixed at a point along the propeller blade; and a resistive wire extending along the leading edge of the blade body from the hub end to the conductive glue; wherein the resistive wire, the conductive glue and the carbon fiber fabric provide a conductive path for an electrical current in an electrical circuit from the hub end through the resistive wire to the conductive glue, and then from the conductive glue to the carbon fiber fabric in the skin of the blade body.

The propeller blade of the first aspect provides an electro-thermal system for preventing ice formation on the surface of the blade. Thus, the conductive elements of the propeller blade, i.e. the resistive wire, conductive glue, and electrically connected carbon fiber fabric, may form parts of a de-icing system. When the propeller blade is in use, an electrical current may be transferred from the hub end of the propeller blade via the resistive wire along the leading edge of the propeller blade. Ice formation is most prevalent on the leading edge of the propeller and so providing a wire with high resistance at this location provides a significant amount of heat to the leading edge to prevent ice formation.

The conductive glue on the blade, which the resistive wire is connected to, means that the electrical current in the resistive wire can be transferred to the carbon fiber fabric within the skin of blade body to conduct the electrical current within desired areas of the blade body and then back to the hub end of the propeller blade. Hence, the resistive wire, conductive glue and carbon fiber fabric in the blade body form a complete circuit for the electrical current within the propeller blade. This is beneficial compared to the prior art as there is no need for the resistive wire to follow a complex sinuous path in order to form a circuit and return the electrical current to the hub of the propeller. Instead, the carbon fiber fabric forming the blade body acts to complete the circuit, meaning that example embodiments may require only a single resistive wire.

Further, the inventors have realised that while prior art systems may provide heating to the leading edge surface, there is a need to provide suitable heating effects to other surfaces because, although ice formation may be most prevalent at the leading edge, it can still be significant at other surfaces of the propeller. With the blade of the first aspect, as the carbon fabric in the blade body are configured to conduct the electrical current to return it to the propeller hub, they will also be heated meaning that the system can be used to provide a heated surface across the entire surface of the blade body, and so the propeller body, or a portion of it, becomes a resistive element, not just the leading edge wire. This can therefore be used to limit ice formation across surfaces of the propeller blade other than the leading edge.

The precise location of the conductive glue along the propeller blade may be dependent upon where ice formation is most prevalent. For example, the conductive glue may be located at a point from the hub end which is less than or equal to 50% of the total distance between the hub end and the tip end of the propeller blade. Optionally, the conductive glue may be located at a point from the hub end which is less than or equal to 40% of the total distance between the hub end and the tip end of the propeller blade, further optionally the point may be 30%, 20% or 10% of the total distance between the hub end and the tip end of the propeller blade.

This arrangement is beneficial when ice formation is likely to be more prevalent near the hub end of the propeller blade. For example, in operation, the tangential velocity of the blade is lower near the root which can lead to an increase in ice formation and so it is preferable to concentrate the heating near the hub end to primarily remove ice which may form there.

The resistive wire extends along the leading edge of the blade body to the point where the conductive glue is located.

Alternatively, the conductive glue may be located at the tip end of the propeller blade. As a further alternative the conductive glue may be located at a point which is between the 50% and 100% of the total distance between the hub end and the tip end.

By providing the conductive glue at the tip end, it is possible for any of the carbon fiber fabric across the entire propeller blade to form a conductive element for the return path in the electrical circuit, meaning that the entire propeller blade can optionally act as a resistive element. In this case, the entire surface of the propeller blade, or selected areas at any point on the surface of the propeller blade, can be heated so that ice formation is prevented at any desired point on the surface of the blade.

The conductive glue may be an amalgam of conductive particles and epoxy resin, such as a resin mixed with a conductive filler comprising particles with a conductive coating, conductive powder, and/or conductive flake. This combination means that the glue has sufficient conductive properties and can act as a glue which the resistance wire can be embedded into.

The carbon fiber fabric may only form the skin of the blade body. Alternatively, the entire structure of the blade body may comprise carbon fiber fabric. The carbon fiber fabric may form the skin of the blade body for both the pressure surface and the suctions surface of the blade body. Alternatively, the carbon fiber fabric may only form the skin for one of the pressure surface or the suction surface of the blade body.

The carbon fiber fabric may advantageously be similar to known carbon fiber fabrics used for construction of propeller blades. In this way the proposed arrangement may make use of conductive properties inherent in materials that are already known for use due to their structural properties. Alternatively, the carbon fiber fabric may be adapted to modify the conductive properties in order to obtain a required heating effect. In some examples the carbon fiber fabric is 3K carbon composite. The carbon fiber fabric may have a thickness of between 0.2 and 0.5 mm, optionally 0.25 mm.

The carbon fiber fabric may be mixed with conductive reinforcing materials. The conductive reinforcing materials may be one or more of epoxy resin compositions (e.g. conductive glues), metal and ceramics. This is advantageous as it improves the conductive properties of the carbon fiber fabric within the blade body and allows for more control over the heat flux transmitted throughout the blade body.

The resistive wire on the leading edge may be electrical and/or thermally insulated from the carbon fiber fabric in the skin of the propeller blade. This means that the heat and current is concentrated on the leading edge where ice formation is most likely to occur.

The resistive wire may be embedded within the surface of the propeller blade at the leading edge of the propeller blade. For example, the resistive wire may be embedded within a resin and/or matrix material of the propeller blade. As such the resistive wire may not be visible from the outside of the propeller blade and the presence of the resistive wire may not affect the outer profile of the propeller blade. This means that the aerodynamic properties are not impacted by the resistive wire as the shape of the leading edge does not need to be modified compared to a desired design based on aerodynamic performance. This also means that the resistive wire advantageously does not interfere with any sensor or variable surfaces that may be present.

Optionally, the resistive wire may be located within a trench which runs along the surface of the leading edge of the propeller blade. The trench which houses the resistive wire may be covered by an insulating layer. The insulating layer may be configured so that the aerodynamic properties of the propeller blade are not impacted by the resistive wire.

The insulating layers covering the resistive wire may be a fiber glass composite material, and may be configured to insulate the rest of the propeller blade from both thermal and/or electrical conductivity of the resistive wire.

The resistive wire, the conductive glue and the carbon fiber fabric in the skin of the propeller may be connected in series.

The resistive wire on the leading edge may be a single wire. This provides a much simpler heating arrangement than complex heating pads or panels. The resistive wire may for example be a wire with a resistance of 1 to 16 Ohms/ft (3 to 52 Ohms/m). The wire may be a copper wire or alternatively it may be aluminium or silver. As a further alternative the resistive wire may comprise a metal alloy, for example Nichrome. In examples the wire has a diameter of 0.1 to 0.4 mm.

Alternatively, depending on the size of the propeller blade, the resistive wire may comprise a plurality of wires connected in parallel, or a network of resistive wires. Such a plurality of wires may have a lower resistance than a single wire resulting in an increase in heat generation. This arrangement would be more preferable for larger propeller blades where a single wire cannot provide sufficient heat across the surface of the leading edge.

The thickness of the carbon fiber fabric in the skin of the propeller blade may be constant across the entire surface of the blade body. This provides constant resistance and therefore constant heating across the entire surface of the blade body.

Alternatively, the thickness of the carbon fiber fabric in the skin of the propeller blade may vary across the surface of the blade body. By varying the thickness, more or less resistance can be provided which correlates to more or less heating respectively. A higher thickness of carbon fiber fabric will result in a lower resistance which causes a higher current flow meaning that more heat is generated. For example, in situations where the radially outer section of the propeller blade requires more heating, the thickness of the carbon fiber fabric in the skin may be increased in this section in comparison to the thickness of other sections of carbon fiber fabric in the electrical circuit in order to provide less resistance, which in turn provides more heat locally at the radially outer section to prevent ice formation. Alternatively, in situations where the radially inner section of the propeller blade requires more heating, the thickness of the carbon fiber fabric in the skin may be increased in this section in comparison to the thickness of other sections of carbon fiber fabric in the electrical circuit in order to provide less resistance, which in turn provides more heat at the radially inner section to prevent ice formation. The radially inner section refers to the half of the propeller blade closer to the hub end and the radially outer section refers to the half of the propeller blade closer to the tip end.

The thickness of the carbon fiber fabric in the skin may linearly decrease between the largest thickness to the smallest thickness across the span of the propeller blade. Alternatively, the thickness of the carbon fiber fabric may be constant for a given length of the span, e.g. the first 20% of the span starting from the hub end. The thickness of the carbon fiber fabric may then decrease to a second thickness for the next 20% of the span and so on.

The thickness of the carbon fiber fabric at the leading edge may be greater than at the trailing edge of the propeller blade body. As discussed above, ice formation is more prevalent at the leading edge, and so thicker carbon fiber fabric at the leading edge is beneficial as it provides more heating as required.

The blade body may comprise one or more insulating sections. This provides a further method of adjusting the degree of heating and/or the pattern of heating that arises due to electrical current in the carbon fiber fabric. The insulating sections may electrically isolate certain sections of the carbon fiber fabric within the skin of the blade body so that they do not form part of the conductive path. This means that the conductive path can be controlled as some sections of the skin of the propeller conduct electrical current, while other sections are electrically isolated and therefore not able to conduct the electrical current. This is beneficial as certain sections of the blade body may not require de-icing and so by electrically isolating said sections, the current can be concentrated on areas of the blade body where ice formation is most prevalent. This in turn reduces power consumption, while also maintaining good de-icing properties.

Insulating sections may also be used to electrically isolate the resistive wire on the leading edge from the carbon fiber fabric in the skin of the propeller blade.

The insulating sections may be made of any non-conductive composite material such as a fiberglass composite material or aramid fibers such as Kevlar®.

The heating applied by the carbon fiber fabric may be dependent on the proportion of the chord length covered by the carbon fiber fabric forming the conductive path. For example, the carbon fiber fabric forming the conductive path may extend across the entire chord length, i.e. from the leading edge to trailing edge of the propeller blade, for a given section of the span. Alternatively, the carbon fiber fabric forming the conductive path may only extend along a portion of the chord length. For example, the carbon fiber fabric forming part of the conductive path may extend across up to 90% of the chord length at a given point of the span, optionally it may extend up to 80%, 70%, 60%, 50%, 40%, 30%, 20%, or 10% of the chord length for a given span.

The carbon fiber fabric forming the conductive path may be located proximate to the leading edge of the propeller blade. For example, the carbon fiber fabric forming the conductive path may extend across 50% or less of the chord length starting from the leading edge. Optionally it may extend across 40%, 30%, 20% or 10% of the chord length starting from the leading edge. This means that the electrical current is conducted along a section nearer the leading edge so that the heating is provided nearer to the leading edge where ice formation is most likely to occur.

Alternatively, the carbon fiber fabric forming the conductive path may be located proximate the trailing edge of the propeller blade. For example, the carbon fiber fabric forming the conductive path may extend across 50% or less of the chord length starting from the trailing edge. Optionally it may extend across 40%, 30%, 20% or 10% of the chord length starting from the trailing edge.

As a further alternative, it will be appreciated that the carbon fiber fabric forming the conductive path may extend across a central portion of the chord length of the propeller blade. For example, it may extend from a point which is located 10% of the chord length from the leading edge, to a point which is 90% of the chord length from the leading edge. Optionally, the carbon fiber fabric may extend from a point anywhere between 20-45% of the chord length from the leading edge, to a point anywhere between 55-90% of the chord length from the leading edge.

The portion of the chord length covered by the carbon fiber fabric forming part of the conductive path may be constant across the entire span of the propeller blade. Alternatively, the portion of the chord length covered by the carbon fiber fabric forming the conductive path may vary along the span of the propeller blade depending on where heating is required. This allows the heating to be concentrated to areas where ice formation is more prevalent and to avoid providing a conductive path for the current where ice formation is unlikely, which leads to lower power consumption, while maintaining good de-icing properties. For example, the proportion of the chord length covered by the carbon fiber forming the conductive path may be higher at the hub end than at the tip end. Alternatively, the proportion of the chord length covered by the carbon fiber forming the conductive path may be higher at the tip end than at the hub end. The portion of the chord length covered by the carbon fiber forming the conductive path may linearly decrease along the span from the hub end to the tip end.

As a further alternative, the carbon fiber fabric forming part of the conductive path may be located proximate the leading edge at the hub end, and located proximate the trailing edge at the tip end, or vice versa.

As discussed above, the conductive path may be controlled by positioning insulating sections at certain points within the propeller blade to electrically isolate portions of the carbon fiber fabric. As an alternative, the propeller blade body may only comprise carbon fiber fabric at points where the conductive path is located and other portions of the propeller blade may be formed of a non-conductive material.

According to a second aspect, there is provided a propeller blade for a UAV, the propeller blade comprising: a hub end; a tip end; a blade body comprising a skin of carbon fiber fabric; a conductive glue fixed at a point along the propeller blade; and a carbon fiber patch extending along the leading edge of the blade body from a point proximate the hub end to the conductive glue; wherein the carbon fiber patch, the conductive glue and the carbon fiber fabric provide a conductive path for an electrical current in an electrical circuit through the carbon fiber patch to the conductive glue, and then from the conductive glue to the carbon fiber fabric in the skin of the blade body.

The term "proximate the hub" may be interpreted such that the carbon fiber patch may extend from the hub itself, or alternatively from a point along the leading edge that is at a point between the hub end or tip end, but is closer to the hub end. For example, the point proximate the hub may be approximately 20% or less of the total distance between the hub end or tip end (i.e. total blade body length) from the hub end.

The carbon fiber patch may be electrically isolated from the carbon fiber fabric by an insulating section. The carbon fiber patch may form a section of the skin of carbon fiber fabric. The carbon fiber patch may be mixed with conductive reinforcing materials including one or more of conductive glue, metal particles and ceramic particles.

The carbon fiber patch may extend from the hub end to the conductive glue. As such, the carbon fiber patch may be directly electrically connected to the hub. Alternatively, the carbon fiber patch may be connected to the hub end by a conductive wire. In this instance, the conductive wire may extend along the leading edge of the propeller blade in order to electrically connect the carbon fiber patch to the hub of the propeller. The conductive wire may extend up to 20% of the total distance from the hub end to the tip end (i.e. the length of the blade body).

The conductive wire may comprise any of the features discussed in connection with the resistive wire in the first aspect above. In particular, the conductive wire may be a high resistance wire. The conductive wire may be formed of tungsten or Nichrome. Alternative, the conductive wire may be a low resistance wire and may therefore be formed of a low resistance material such as copper. The resistance of the conductive wire may depend on the heating requirements of the section of the leading edge proximate the hub end.

The carbon fiber patch may extend to the tip of the blade body. In this case, the conductive glue may be provided at the tip of the blade body.

The carbon fiber patch may comprise one or more composite threads, wherein the number of composite threads may determine the thickness of the carbon fiber patch. As will be appreciated, the greater the thickness of the carbon fiber patch, the lower the resistance provided by the carbon fiber patch, and vice versa. As will also be understood as the resistance decreases, less heat is generated by the carbon fiber patch for the same electrical current.

The thickness of the carbon fiber patch may be constant along its length. This enables the carbon fiber patch to generate constant heat along its length.

Alternatively, the thickness of the carbon fiber patch may vary along the length of the leading edge of the blade body. The thickness of the carbon fiber patch may be increase by providing additional composite threads. This may enable the carbon fiber patch to provide a varying temperature along its length according to the heating requirements of the propeller blade. For instance, the sections of the blade body near to the hub end have a lower linear velocity meaning they have relatively lower heating requirements compared to the sections of the blade body nearer to the tip end of the blade body.

Hence, the thickness of the carbon fiber patch at the hub end of the blade body may be larger than the thickness of the carbon fiber patch along the rest of the leading edge. The thickness of the carbon fiber patch may vary linearly. For instance, the thickness may be greatest at the point of the carbon fiber patch closest to the hub end and the thickness may then linearly decrease along the length of the carbon fiber patch. Alternatively, the thickness of the carbon fiber patch may vary in a stepwise manner. More specifically, the thickness may be constant for a first discrete portion of the carbon fiber patch along the leading edge, and may then be a different thickness for a second discrete portion of the carbon fiber patch along the leading edge.

The carbon fiber patch may comprise one or more branches. The one or more branches may extend in a chordwise direction from the leading edge towards a trailing edge of the blade body. The one or more branches may be the same thickness as the section of the carbon fiber patch they branch from. The one or more branches may extend in a chordwise direction from the leading edge towards the trailing edge of the blade body by up to 60% of the total chord length, optionally up to 40%, optionally up to 20%. The one or more branches may be located at points along the blade body with a greater heating requirement.

This is beneficial as it allows sections of the carbon fiber patch to extend further into the blade body where additionally heating is required. This is of particular benefit for areas of the blade body with a high angle of attack where the airflow may impact the area below the leading edge. This can lead to ice accumulation away from the leading edge and so the branches of the carbon fiber patch may still provide the necessary heating to those areas.

Each of the one or more branches may extend in a chordwise direction by the same proportion of the total chord length. Alternatively, the proportion of the chord length by which each of the one or more branches extend may vary. This allows either an increase or decrease in the amount of heat supplied to certain areas of the blade body to be adjusted depending on the heating requirements.

The propeller blade according to the second aspect may comprise any of the features discussed in connection with the first aspect above.

Viewed from yet a further aspect, there is provided a propeller blade for a UAV, the propeller blade comprising: a hub end; a tip end; a blade body comprising a skin of carbon fiber fabric; a conductive glue fixed at a point along the propeller blade; and a conductive pathway extending along the leading edge of the blade body from the hub end to the conductive glue; wherein the conductive pathway, the conductive glue and the carbon fiber fabric provide a conductive path for an electrical current in an electrical circuit from the hub end along the conductive pathway to the conductive glue, and then from the conductive glue to the carbon fiber fabric in the skin of the blade body.

The conductive pathway extending along the leading edge may be a resistive wire as set out in the first aspect above. Alternatively, the conductive pathway extending along the leading edge may be a carbon fiber patch as set out in the second aspect above.

The propeller blade according to the present aspect may comprise any of the features discussed in the first and second aspects above.

According to a further aspect there is provided a propeller for a UAV comprising a plurality of propeller blades according to the first aspect or second aspect.

The propeller for a UAV may comprise any of the features discussed in connection with the first aspect and/or the second aspect connected to a propeller hub.

The propeller hub may comprise a propeller bore. The propeller bore allows the propeller to be mounted to a rotor shaft of the UAV. The propeller hub may comprise a metal conductive ring. The metal conductive ring may extend around the entire circumference of the propeller hub and may encircle the propeller bore.

The metal conductive ring may be electrically connected to the resistive wire in each propeller blade. The metal conductive ring may be configured to receive electrical power from a power source located on the UAV, such as via a slip ring arrangement at the metal conductive ring or at some other point on the rotor shaft. This arrangement allows electrical current to be transferred from the power source to the resistive wire on the leading edge of the propeller blade. A conductive circuit may therefore be formed by the metal conductive ring, the resistive wire, the conductive glue and the carbon fiber fabric in the skin of the propeller blade.

The propeller hub may comprise an insulating layer to electrically isolate the metal conductive ring from the rest of the propeller hub.

The arrangement and/or lay-up of the carbon fiber fabric in each propeller blade on the propeller may be identical. Alternatively, different arrangements and/or lay-ups may be used on each propeller blade.

The propeller for the UAV may be less than 1.5 metres in diameter, optionally less than 1 metre in diameter, further optionally less than 0.5 metres in diameter.

The propeller blades of the first aspect and/or second aspect, or the propeller of the above aspect, may be included within a propeller system that also comprises further elements of a de-icing system. Thus, a propeller system with a de-icing arrangement may comprise a propeller blade or propeller with any or all features as discussed above, wherein the electrical circuit including the resistive wire or carbon fiber patch, conductive glue, and carbon fiber fabric is an electrical circuit of an electro-thermal system of the de-icing arrangement. The propeller system may further comprise an electrical power source for the de-icing arrangement, such as a battery. Advantageously, the de-icing arrangement may make use of the same power source that is used for propulsion of the UAV via the propeller blade(s). The electrical power source may be located on the aircraft main body when the propeller system is in use.

The propeller system may comprise a power transmission for providing electrical power to the metal conductive ring or the resistive wire via a rotatable shaft from the electrical power source. The power transmission may be the same transmission that is used for transmission of mechanical power to the propeller.

The power transmission may comprise a rotatable shaft extending from an aircraft end to a propeller end. The aircraft end may be connected to first and second terminals of the electrical power source. The propeller end may be located within a propeller bore of the propeller hub and may be electrically connected to the metal conductive ring or the resistive wire. The electrical connection to the metal conductive ring or the resistive wire may be via a first and second terminal.

The rotatable shaft may comprise an inner conductor, an outer conductor and an electrical insulator. The inner conductor, outer conductor and electrical insulator may have a concentric arrangement where the outer conductor is located radially outward of the inner conductor. The electrical insulator may be disposed between the inner conductor and outer conductor.

The inner conductor may extend along the length of the rotatable shaft to provide an electrically conductive path between the first terminal of the aircraft end to the first terminal of the propeller end. The outer conductor may extend along the length of the shaft to provide an electrically conductive path between the second terminal of the aircraft end to the second terminal of the propeller end.

The outer conductor may be a circular tube and the insulator may be a circular tube fitted within the tube of the outer conductor along all or most of its length. The inner conductor may have a circular outer cross-section and may be fitted within the tube of the insulator.

At the aircraft end of the rotatable shaft, the outer surfaces of the outer conductor and the inner conductor may provide a slip ring surface for the connection to the first and second terminal. At the propeller end of the rotatable shaft, the inner and outer conductor may directly contact the surface of the metal conductive ring.

The propeller system may further comprise one or more sensors. The one or more sensors may be powered by the same electrical power source as the de-icing systems. The one or more sensors may be configured to detect ambient conditions, such as air temperature and pressure, as well as air speed and altitude. The propeller system may further comprise a control system for de-icing. The control system may be configured to receive information from the one or more sensors. The control system may be configured to detect the presence ice or likelihood of ice formation occurring based on the received information. If the control system detects ice formation, or a high likelihood of ice formation, it may be configured to activate the de-icing system.

According to a further aspect, there is provided a UAV comprising one or more propellers or propeller systems as discussed above. The UAV may be an electric UAV wherein the propulsion systems, e.g. the propellers, are electrically powered. Advantageously the electrical power for propulsion and electrical power for the electrical circuit in the propeller blade(s) may make use of the same electrical power source, such as a battery. The UAV may comprise the power transmission as discussed above to provide electrical and/or mechanical power to the propeller from the electrical power source.

The UAV may comprise one or more propellers arranged in a tiltrotor arrangement, wherein the propellers are arranged predominantly in a horizontal plane. Alternatively or additionally, one or more propellers of the UAV may be arranged in a vertical plane. The horizontal/vertical plane are relative to the intended direction of travel of the UAV in operation.

According to a further aspect, there is provided a method of de-icing a propeller blade, comprising providing a propeller blade, propeller, propeller system or UAV as above and conducting an electrical current through the resistive wire, the conductive glue and the carbon fiber fabric in series to thereby heat surfaces of the propeller blade. The method may comprise providing a propeller blade with a hub end; a tip end; a blade body comprising carbon fiber fabric; a conductive glue fixed at a point along the propeller blade; and a resistive wire extending along the leading edge of the blade body from the hub end to the conductive glue. The method may further comprise providing other features as discussed above, such as using a common electrical power source for propulsion and de-icing.

According to a further aspect, there is provided a method of de-icing a propeller blade, comprising providing a propeller blade, propeller, propeller system or UAV as above and conducting an electrical current through the carbon fiber patch, the conductive glue and the carbon fiber fabric in series to thereby heat surfaces of the propeller blade. The method may comprise providing a propeller blade with a hub end; a tip end; a blade body comprising carbon fiber fabric; a conductive glue fixed at a point along the propeller blade; and a carbon fiber patch extending along the leading edge of the blade body from the hub end to the conductive glue.

According to a still further aspect, there is provided a method of forming a propeller blade in accordance with the first aspect. The method may comprise assembling a propeller blade with a hub end, a tip end, and a blade body comprising a skin of carbon fiber fabric, with a conductive glue fixed at a point along the propeller blade, and a resistive wire extending along the leading edge of the blade body from the hub end to the conductive glue; wherein the method includes electrically connecting the resistive wire, the conductive glue and the carbon fiber fabric to provide a conductive path for an electrical current in an electrical circuit from the hub end through the resistive wire to the conductive glue, and then from the conductive glue to the carbon fiber fabric in the skin of the blade body. The method may further comprise providing any or all other features as discussed above with reference to other aspects of the invention.

According to a still further aspect, there is provided a method of forming a propeller blade in accordance with the second aspect. The method may comprise assembling a propeller blade with a hub end, a tip end, and a blade body comprising a skin of carbon fiber fabric, with a conductive glue fixed at a point along the propeller blade, and a carbon fiber patch extending along the leading edge of the blade body from the hub end to the conductive glue; wherein the method includes electrically connecting the carbon fiber patch, the conductive glue and the carbon fiber fabric to provide a conductive path for an electrical current in an electrical circuit from the hub end through the carbon fiber patch to the conductive glue, and then from the conductive glue to the carbon fiber fabric in the skin of the blade body. The method may further comprise providing any or all other features as discussed above with reference to other aspects of the invention.

The de-icing system disclosed in connection with any of the above aspects may be used in conjunction with mechanical and/or chemical de-icing systems.

Certain preferred embodiments of the present invention will now be described, by way of example only, with reference to the following drawings, in which.

Figure 1:
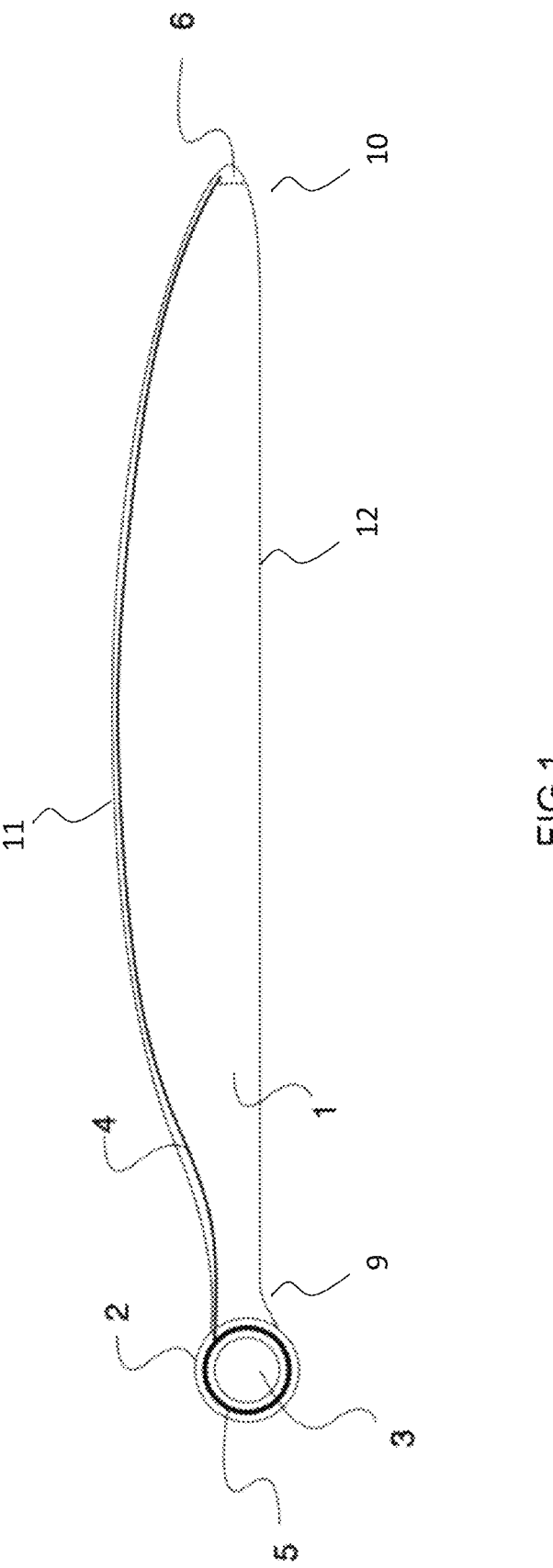
FIG. 1 shows an individual propeller blade comprising an electrical circuit for a de-icing system.
Figure 2:
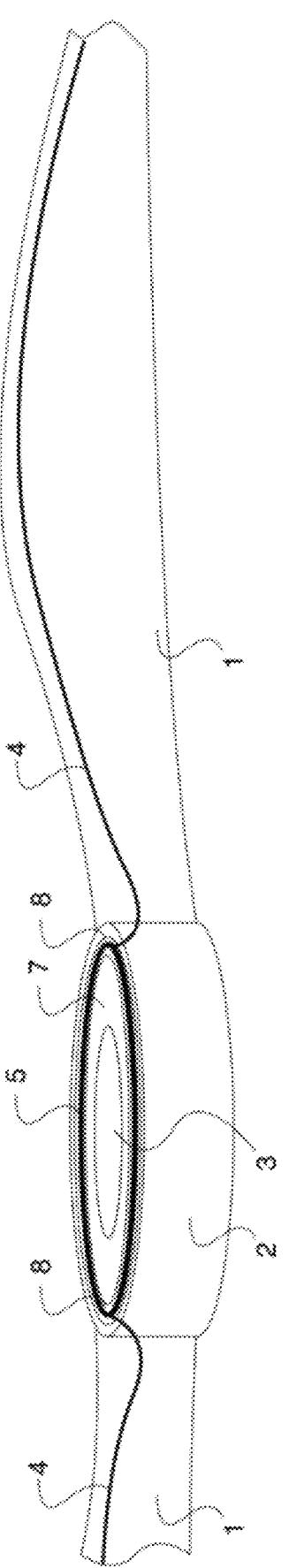
FIG. 2 shows further view of a propeller blade and propeller hub comprising an electrical circuit for a de-icing system.

Referring to both FIGS. 1 and 2 a schematic view of a propeller blade for a UAV is shown. The propeller blade comprises the de-icing system in accordance with the present invention and includes a blade body 1 that comprises a leading edge 11, a trailing edge 12, a hub end 9 and a tip end 10.

The blade body 1 is connected to a propeller hub 2. The propeller hub 2 comprises a metal conductive ring 5, which extends around the entire circumference of the propeller hub 2 and encircles a propeller hub bore 3. The metal conductive ring 5 is connected to a power source (not shown) located elsewhere on the UAV and is isolated from the rest of the propeller hub 2 by an insulating layer 8.

The metal conductive ring 5 is electrically connected to a resistive wire 4 that runs along the leading edge 11 of the blade body 1. In the present embodiment the resistive wire 11 is embedded within the blade body 1 so that it does not have any effect on the aerodynamic properties of the blade body 1. However, the resistive wire 4 may be located within a trench on the leading edge 11 and then covered with an insulating layer.

The resistive wire 4 runs along the entire length of the leading edge 11 of the blade body and interacts with a conductive glue 6 located at the tip end 10. The conductive glue 6 is an amalgam of metal particles and epoxy resin so that it is capable of conducting an electrical current from the resistive wire.

The blade body 1 comprises a skin which is made of carbon fiber fabric. The carbon fiber fabric is also able to conduct an electrical current, and its conductive properties can be further enhanced by mixing it with conductive reinforcing materials such as epoxy resin, metal or ceramics.

FIG. 2 shows a section of a propeller with two propeller blades mounted to the propeller hub 2. However, it will be appreciated that the propeller hub 2 may have any acceptable number of propeller blades mounted to it, such as 4 or 6. Each propeller blade comprises a blade body 1 with a resistive wire 4 on the leading edge, and the resistive wires 4 in each propeller blade are all connected to the same metal conductive ring 5.

Within a single propeller blade, the resistive wire 4, the conductive glue 6 at the tip of the blade body 1 and the carbon fiber fabric in the skin of the blade body 1 are connected in series and form a conductive path for an electrical current. This conductive path serves to conduct the electrical current from the metal conductive ring 5 to the conductive glue 6 via the resistive wire 4, and then return the electrical current to the metal conductive ring 6 from the conductive glue 6 via the carbon fiber fabric in the skin of the blade body 1.

Due to the electrical resistance of the various electrically conductive components, the electrical current is converted to heat, which is used to prevent ice formation on the surface of the blade body 1. Ice formation is most prevalent at the leading edge 11 of the blade body 1, and so the resistive wire 4 is present to concentrate the heating effect at the leading edge 11. The resistive wire 4 in the present embodiment is a single metal wire, but other configurations are also possible. For example, multiple wires arranged in a network may be used depending on the size of the blade body 1.

The thickness of the carbon fiber fabric in the blade body 1 is constant across the surface area. This provides a constant heating effect across the surface of the blade. However, this can be adapted depending on the aerodynamic design of the blade body and/or on heating requirements of the de-icing system. For example, ice formation may be more prevalent nearer to the hub end 9, or the leading edge 11, and so the thickness of the carbon fiber fabric in the skin of the blade body 1 can be adjusted to provide the appropriate resistance, which provides the necessary heating at that point. At other points of the blade body 1, the carbon fiber fabric may not be present if no heating is required. This allows the electrical current to be concentrated at certain areas of the blade body 1 in order to conserve power.

The blade body 1 also comprises insulated sections (not shown) that electrically isolate portions of the carbon fiber fabric so that they do not form part of the conductive path. The insulating sections may be made of fiber glass composite.

The carbon fiber fabric in the skin of the blade body 1, which forms a part of the conductive path, extends across the entire surface area of the blade body 1 so that carbon fiber at any point over the entire propeller blade can form a resistive element. However, it will be appreciated that only a portion of the blade body 1 may form a resistive element in certain cases. For example, the conductive glue 6 may be placed at an intermediate point along the blade body 1 if de-icing is not necessary at the tip end 10 and/or if it is preferred to use parts of the carbon fiber fabric as the conductive element along more distal parts of the blade body 1 beyond the extent of the resistive wire 4.

In addition, the carbon fiber fabric which forms part of the conductive path may only extend over a portion of the chord length for a given length of the span. The remaining portion of the chord length may be electrically isolated using one or more insulating sections. Although not shown in the Figures, the carbon fiber fabric forming the conductive path can extend over a different proportion of the chord length at various points along the span of the blade body 1. For example, the carbon fiber fabric forming a part of the conductive path may extend over up to 80% of the chord length, or optionally as little as 10% of the chord length for a given span. This proportion of chord length over which the carbon fiber fabric forming the conductive path extends may be constant across the span, or it may vary depending on where heating is required.

The propeller blade shown in FIGS. 1 and 2 forms part of a propeller that comprises two or more of the propeller blades each connected to the propeller hub 2. The propeller is then mounted to a UAV via the propeller bore 3. The overall diameter of each propeller is typically less than 1.5 metres, for example the propeller may have a diameter of 1 metre or less from tip to tip.

The UAV is an electrically powered, small-scale, aircraft that comprises one or more of the propellers. The electrical power is used for propulsion as well as for the de-icing arrangement on the propeller blades. The propeller(s) of the UAV can be arranged in either a horizontal or vertical arrangement relative to the intended direction of travel of the UAV. In applications comprising two or more of the propellers, some of the propellers may be arranged in a horizontal configuration, and others may be arranged in a vertical configuration so that some can provide lift, while others can provide thrust.

Figure 3:
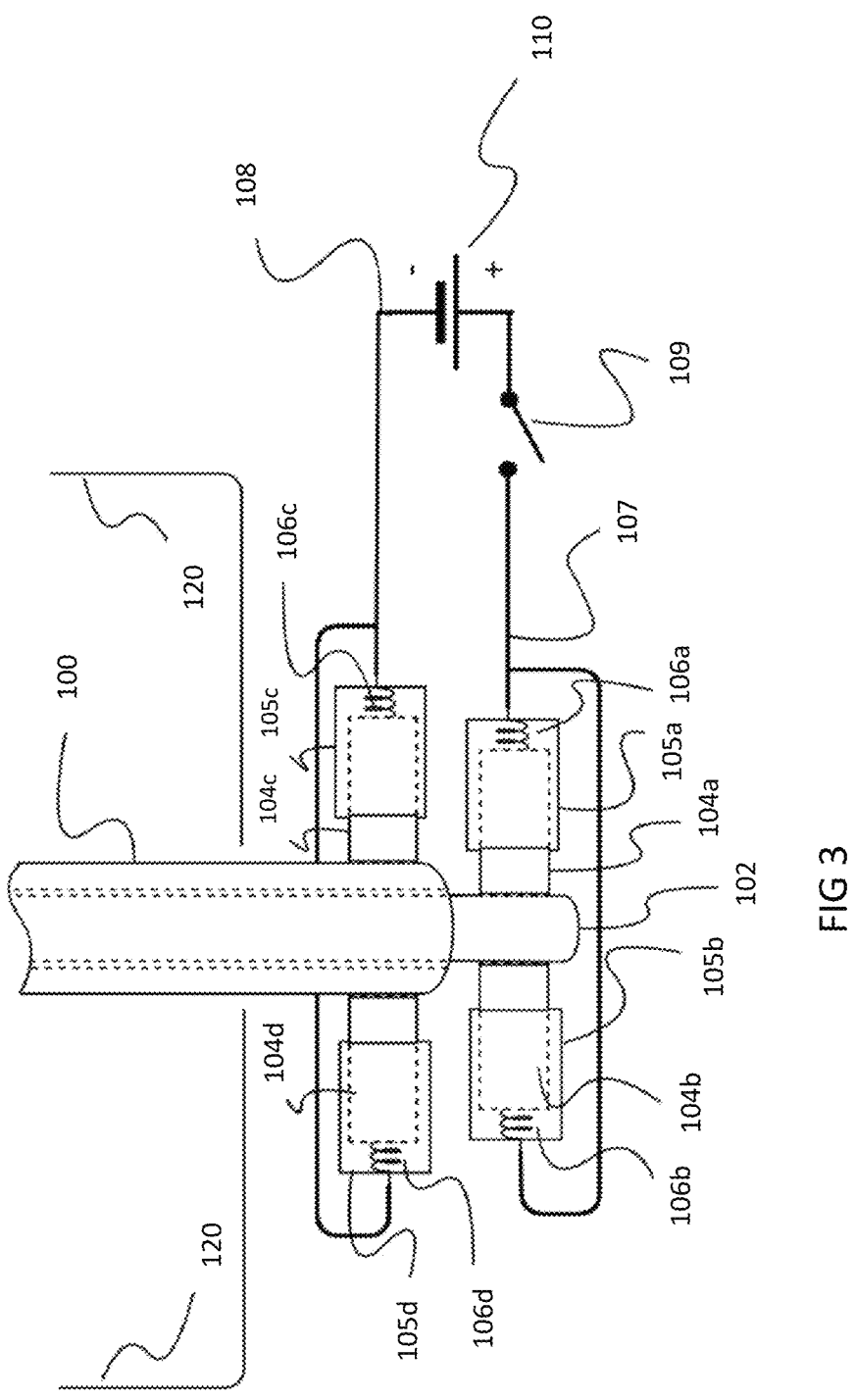
FIG. 3 shows an aircraft end of a power transmission of a propeller system.
Figure 4:
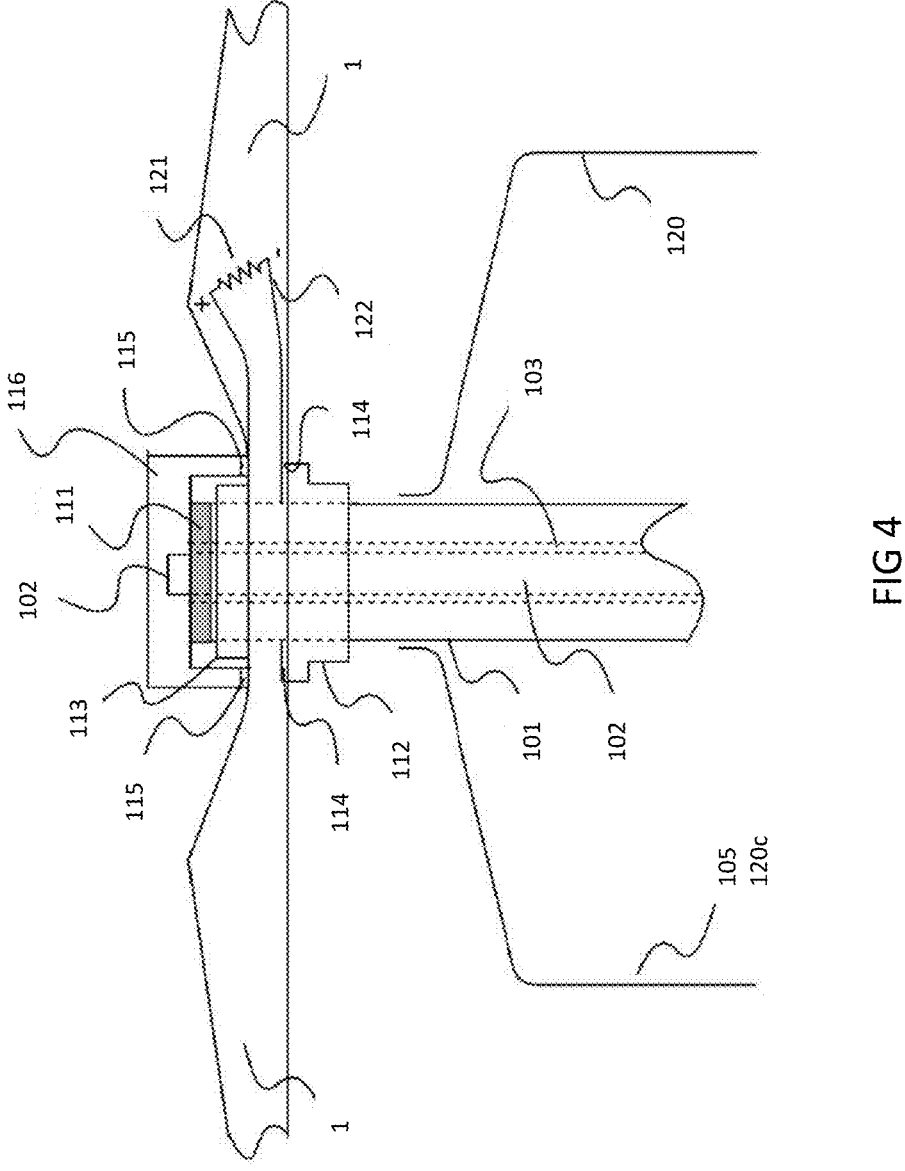
FIG. 4 shows a propeller end of a power transmission of a propeller system.

The propeller blade of FIGS. 1 and 2 may be used with any suitable propeller system, which typically provides mechanical power to rotate the propeller as well as electrical power for the de-icing arrangement. One possible arrangement is shown in FIGS. 3 and 4, which show a propeller system with an exemplary power transmission for providing both electrical and mechanical power to the propeller blades 1 from an electrical power source 110. The power transmission comprises a rotatable shaft that extends from an aircraft end to a propeller end. FIG. 3 shows the aircraft end of the power transmission and FIG. 4 shows the propeller end of the power transmission.

With reference to FIG. 2, the bottom end of the inner conductor 102, which is at an aircraft end of the shaft, is energised with positive potential energy via a carbon brushes 104*a*, 104*b* and the bottom end of the outer conductor 100 is grounded with further carbon brushes 104*c*, 104*d*. The carbon brushes 104*a*, 104*b*, 104*c*, 104*d* are biased toward the shaft by respective springs 106*a*, 106*b*, 106*c*, 106*d* within suitable cylinders 105*a*, 105*b*, 105*c*, 105*d*. The surfaces of the inner and outer conductors hence provide a slip ring arrangement. Other suitable slip ring designs could alternatively be used. This forms the basis for an aircraft end electrical connection. The aircraft end of the shaft can also have mechanical connections (not shown) for coupling to a motor for powering the propeller.

The aircraft end electrical connection includes the two pairs of conductive brushes 104*a*, 104*b*, 104*c*, 104*d*, electrical connectors 107, 108, a power source 110, and a switching mechanism 109. In this way, the aircraft end of the shaft is electrically connected to first and second terminals for an electrical circuit on the aircraft. The aircraft electrical circuit may be used to provide electrical power to the metal conductive ring or resistive wire, as well as a control system for controlling the operation of the de-icing circuit.

At the propeller end of the shaft, as show in FIG. 4, there is provided a propeller with at least one propeller blade 1, a propeller locking mechanism 112, 113, a non-conductive washer 111, and a custom hub cap 116. The propeller locking mechanism 112, 113 includes a bottom propeller locking nut 112 and a top propeller locking nut 113. The bottom propeller locking nut 112 also provides a first collar as a part of aircraft end electrical connections. There is electrical contact between the inner surface of the bottom propeller locking nut 112 and the outer surface of the outer conductor 100, and electrical contact at an axial facing surface of the bottom propeller locking nut 112 with first contact surfaces 114 on the propeller. This connects the first terminal at the aircraft end electrical connection to a first terminal at the propeller end electrical connection via the conductive pathway provided by the outer conductor. This electrical connection can provide electrical power to the metal conductive ring 8 which is electrically connected to the resistive wire 4, or directly to the resistive wire 4.

The top propeller locking nut 113 is in mechanical contact with shaft and this secures the propeller on the shaft, pressing it against the bottom propeller locking nut 112. In this example the top propeller locking nut 113 does not have any electrical function. To ensure that there is no conductance of electricity from the outer conductor 100 via the top propeller locking nut 113 an electrically insulating washer is placed on top of the top propeller locking nut 113.

To complete the electrical circuit via connection of the second terminals the propeller end electrical connections use a second electrically conductive collar 116 provided in this example by the hub cap 116. The cap 116 has a cupped shape and the rim of the cup is placed in electrical contact with a second contact surface 115 which may be a part of the metal conductive ring 8 or a surface in electrical contact with the resistive wire 4, with the base of the cup in electrical contact with the inner cylinder 102.

The electrical circuit allows for power to be provided via the inner conductor 102 and outer conductor 100 to the de-icing circuit. It will be appreciated that the above power transmission is exemplary only, and alternative arrangement for electrically connecting a power source and the de-icing circuit may be used.

Figure 5:
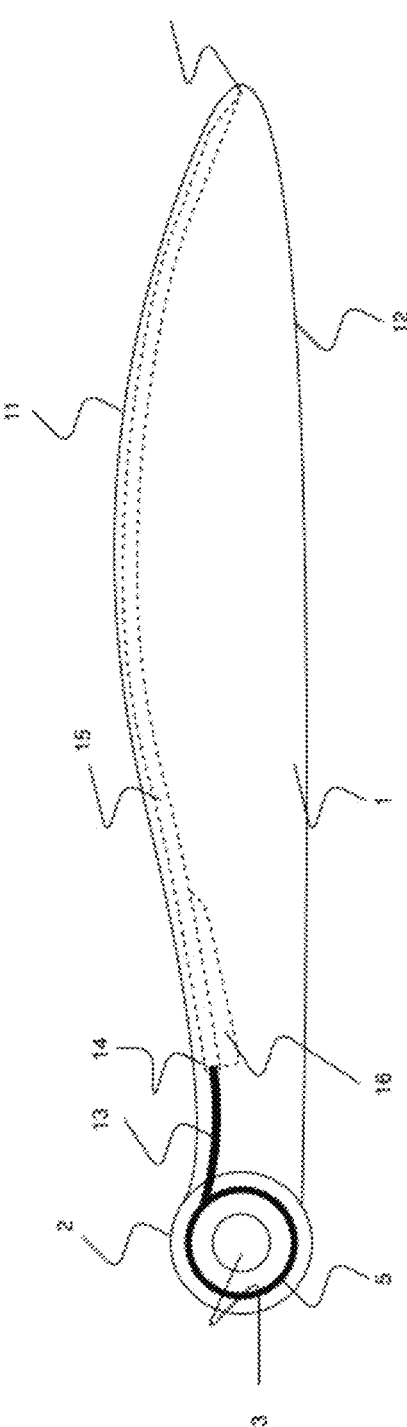
FIG. 5 shows another individual propeller blade comprising an electrical circuit for a de-icing system.

FIG. 5 depicts an alternative arrangement of the de-icing circuit within a propeller blade. As in FIG. 1, the propeller blade comprises a blade body 1 including a leading edge 11, a trailing edge 12, a hub end 9 and a top end 10. The blade body 1 is connected to a propeller hub 2 which comprises a metal conductive ring 5, which extends around the entire circumference of the propeller hub 2 and encircles a propeller hub bore 3. The metal conductive ring 5 is connected to a power source (not shown) located elsewhere on the UAV and is isolated from the rest of the propeller hub 2 by an insulating layer 8.

The blade body 1 comprises a carbon fiber patch 15 extending along the leading edge 11 from a point proximate the hub end 9 towards a tip end 10. The carbon fiber patch is electrically connected to the metal conductive ring 5 by a conductive wire 13. The conductive wire 13 may be a high resistance wire formed of tungsten or Nichrome or a low resistance wire formed of copper. The material used for the conductive wire may depend on the heating requirements of the root portion of the blade body 1.

The portion 16 of the carbon fiber patch 15 nearer to the hub end 9 has a greater thickness than the remaining portion of the carbon fiber fabric 15. This can be achieved by providing additional layers of composite fibers to increase the thickness. The greater the thickness of the carbon fiber patch 15, the lower the resistance is meaning less heat will be generated for the same current. The sections of the blade body 1 nearer to the hub end 9 have lower heating requirements as the linear velocity is lower. This is therefore accounted for by providing a portion 16 of greater thickness.

Figure 6:
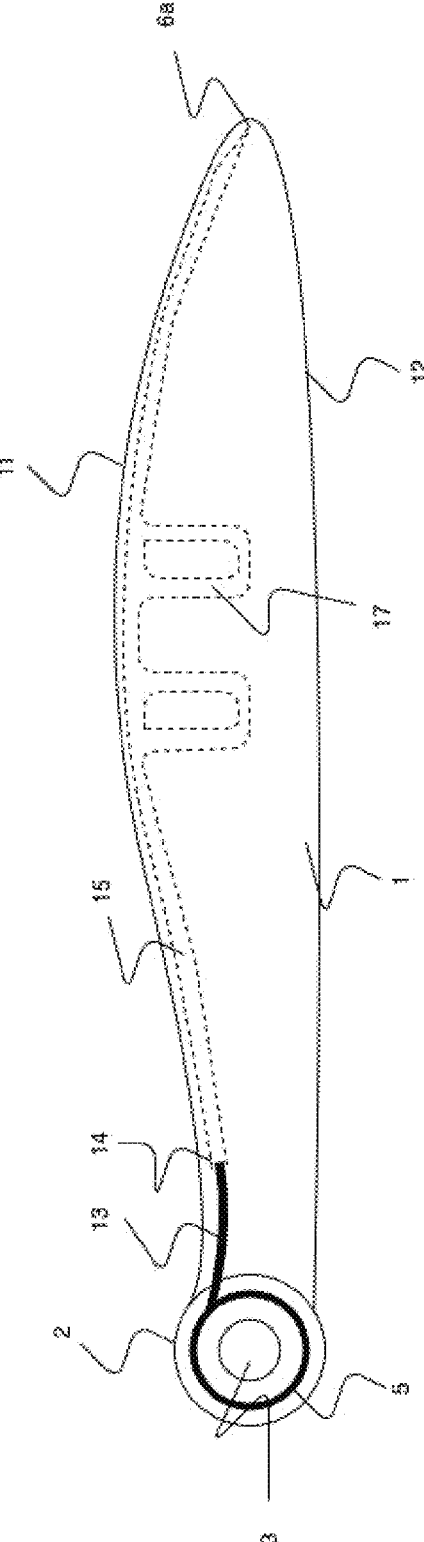
FIG. 6 shows a further individual propeller blade comprising an electrical circuit for a de-icing system.

FIG. 6 shows an alternative arrangement where the carbon fiber patch 15 includes two branches 17. The branches 17 extend in a chordwise direction from the leading edge 11 towards the trailing edge 12 of the blade body 1. The two branches 17 extend in a chordwise direction approximately 60% of the total chord length. The use of these two branches 17 means that the heat surface can extend to other parts of the blade body 1 away from the leading edge 11. This of particular benefit in areas with a higher angle of attach where the point at which the airflow impacts the blade body 1 may be away from the leading edge 11 meaning that ice accumulation may also occur away from the leading edge 11.

The invention claimed is:

1. A propeller blade for a UAV, the propeller blade comprising:
   a hub end;
   a tip end;
   a blade body comprising a skin of carbon fiber fabric;
   a conductive glue fixed at a point along the propeller blade; and a carbon fiber patch extending along the leading edge of the blade body from a point proximate the hub end to the conductive glue;

wherein the carbon fiber patch, the conductive glue and the carbon fiber fabric in the skin of the blade body provide a conductive path for an electrical current in an electrical circuit through the carbon fiber patch to the conductive glue, and then from the conductive glue to the carbon fiber fabric in the skin of the blade body;

wherein the carbon fiber patch is electrically isolated from the carbon fiber fabric in the skin of the blade body by an insulating section;

wherein the thickness of the carbon fiber patch varies along the length of the leading edge of the blade body in a stepwise manner, such that the thickness is constant for a first discrete portion of the carbon fiber patch, and the thickness is different for a second discrete portion of the carbon fiber patch;

wherein the thickness of the carbon fiber patch at a hub end of the blade body is larger than the thickness of the carbon fiber patch along the rest of the leading edge.

2. The propeller blade as claimed in claim 1, wherein the carbon fiber patch forms a section of the skin of carbon fiber fabric.

3. The propeller blade as claimed in claim 1, wherein the carbon fiber patch is connected to the hub end by a conductive wire.

4. The propeller blade as claimed in claim 3, wherein the conductive wire is a high resistance wire.

5. The propeller blade as claimed in claim 3, wherein the conductive wire is tungsten or Nichrome.

6. The propeller blade as claimed in claim 1, wherein the carbon fiber patch comprises one or more branches.

7. The propeller blade as claimed in claim 6, wherein the one or more branches extend in a chordwise direction from the leading edge towards a trailing edge of the blade body.

8. The propeller blade as claimed in claim 7, wherein the one or more branches extend in a chordwise direction from the leading edge towards the trailing edge of the blade body by up to 60% of the total chord length.

9. The propeller blade as claimed in claim 1, wherein the conductive glue is located at the tip end of the propeller blade.

10. The propeller blade as claimed in claim 1, wherein the conductive glue is an amalgam of conductive particles and epoxy resin.

11. The propeller blade as claimed in claim 1, wherein the carbon fiber fabric and/or carbon fiber patch is mixed with conductive reinforcing materials including one or more of conductive glue, metal particles and ceramic particles.

12. The propeller blade as claimed in claim 1, wherein the thickness of the carbon fiber fabric is constant across the entire surface of the blade body.

13. The propeller blade as claimed in claim 1, wherein the thickness of the carbon fiber fabric varies across the surface of the blade body.

14. The propeller blade as claimed in claim 13, wherein the thickness of the carbon fiber fabric is greater at the radially inner section of the blade body than at the radially outer section of the blade body.

15. The propeller blade as claimed in claim 13, wherein the thickness of the carbon fiber fabric at the leading edge is greater than at the trailing edge.

16. The propeller blade as claimed in claim 1, wherein the carbon fiber fabric forming part of the conductive path extends across the entire chord length of the propeller blade for a given section of the span.

17. The propeller blade as claimed in claim 1, wherein the carbon fiber fabric forming part of the conductive path extends across a portion of the chord length of the propeller blade.

18. A method of de-icing a propeller blade comprising:

providing a propeller blade as claimed in claim 1;

conducting an electrical current through the carbon fiber patch, the conductive glue and the carbon fiber fabric in series to thereby heat surfaces of the propeller blade.

19. A method of forming a propeller blade as claimed in claim 1, the method comprising:

assembling a propeller blade with a hub end, a tip end, and a blade body comprising a skin of carbon fiber fabric, with a conductive glue fixed at a point along the propeller blade, and a carbon fiber patch extending along the leading edge of the blade body from the hub end to the conductive glue;

wherein the method includes electrically connecting the carbon fiber patch, the conductive glue and the carbon fiber fabric to provide a conductive path for an electrical current in an electrical circuit from the hub end through the carbon fiber patch to the conductive glue, and then from the conductive glue to the carbon fiber fabric in the skin of the blade body.

20. A propeller for a UAV comprising a plurality of propeller blades, each propeller blade of the plurality of propeller blades comprises:

a hub end;

a tip end;

a blade body comprising a skin of carbon fiber fabric;

a conductive glue fixed at a point along the propeller blade; and a carbon fiber patch extending along the leading edge of the blade body from a point proximate the hub end to the conductive glue; wherein the carbon fiber patch, the conductive glue and the carbon fiber fabric in the skin of the blade body provide a conductive path for an electrical current in an electrical circuit through the carbon fiber patch to the conductive glue, and then from the conductive glue to the carbon fiber fabric in the skin of the blade body;

wherein the carbon fiber patch is electrically isolated from the carbon fiber fabric in the skin of the blade body by an insulating section;

wherein the thickness of the carbon fiber patch varies along the length of the leading edge of the blade body in a stepwise manner, such that the thickness is constant for a first discrete portion of the carbon fiber patch, and the thickness is different for a second discrete portion of the carbon fiber patch;

wherein the thickness of the carbon fiber patch at a hub end of the blade body is larger than the thickness of the carbon fiber patch along the rest of the leading edge.

21. A UAV comprising one or more propeller, each propeller of the one or more propellers comprises a plurality of propeller blades, each propeller blade of the plurality of propeller blades comprises:

a hub end;

a tip end;

a blade body comprising a skin of carbon fiber fabric;

a conductive glue fixed at a point along the propeller blade; and a carbon fiber patch extending along the leading edge of the blade body from a point proximate the hub end to the conductive glue;

wherein the carbon fiber patch, the conductive glue and the carbon fiber fabric in the skin of the blade body provide a conductive path for an electrical current in an electrical circuit through the carbon fiber patch to the conductive glue, and then from the conductive glue to the carbon fiber fabric in the skin of the blade body;

wherein the carbon fiber patch is electrically isolated from the carbon fiber fabric in the skin of the blade body by an insulating section;

wherein the thickness of the carbon fiber patch varies along the length of the leading edge of the blade body in a stepwise manner, such that the thickness is constant for a first discrete portion of the carbon fiber patch, and the thickness is different for a second discrete portion of the carbon fiber patch;

wherein the thickness of the carbon fiber patch at a hub end of the blade body is larger than the thickness of the carbon fiber patch along the rest of the leading edge.

* * * * *